(12) United States Patent
Tanigawa et al.

(10) Patent No.: US 8,514,702 B2
(45) Date of Patent: Aug. 20, 2013

(54) RADIO BASE STATION, RADIO EQUIPMENT CONTROL AND RADIO EQUIPMENT

(75) Inventors: Daisuke Tanigawa, Kawasaki (JP); Hidehiko Oyane, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 156 days.

(21) Appl. No.: 13/145,409

(22) PCT Filed: Jan. 20, 2010

(86) PCT No.: PCT/JP2010/050616
§ 371 (c)(1),
(2), (4) Date: Aug. 30, 2011

(87) PCT Pub. No.: WO2010/084876
PCT Pub. Date: Jul. 29, 2010

(65) Prior Publication Data
US 2011/0317550 A1    Dec. 29, 2011

(30) Foreign Application Priority Data

Jan. 20, 2009  (JP) ................................. 2009-010269

(51) Int. Cl.
*G01R 31/08* (2006.01)
(52) U.S. Cl.
USPC ........................... 370/230; 370/235; 370/241
(58) Field of Classification Search
USPC ....................................................... 370/225
See application file for complete search history.

(56) References Cited

U.S. PATENT DOCUMENTS

| 20070/195832 | 8/2007 | Liu | |
| 2007/0195832 A1* | 8/2007 | Liu | ............................... 370/539 |

FOREIGN PATENT DOCUMENTS

| JP | 2007 507957 | 3/2007 |
| JP | 2007 533179 | 11/2007 |
| WO | 2008 120297 | 10/2008 |

OTHER PUBLICATIONS

CPRI Specification V4.0. "Common Public Radio Interface (CPRI); Interface Specification." (Jun. 30, 2008).
International Search Report issued Feb. 23, 2010 in PCT/JP10/50616 filed Jan. 20, 2010.

* cited by examiner

*Primary Examiner* — Steven H Nguyen
*Assistant Examiner* — Abu-Sayeed Haque
(74) *Attorney, Agent, or Firm* — Oblon, Spivak, McClelland, Maier & Neustadt, L.L.P.

(57) ABSTRACT

A radio base station wherein, when a radio equipment control detects an uplink communication failure on a physical circuit, a downlink communication processing unit is configured to transmit a downlink IQ data for all combinations of antennae and carriers to a radio equipment with all values of the downlink IQ data set to "0," and a downlink radio equipment is configured to stop a transmission of a downlink signal of all the carriers through all the antenna when the downlink IQ data whose values are all "0" is received.

8 Claims, 4 Drawing Sheets

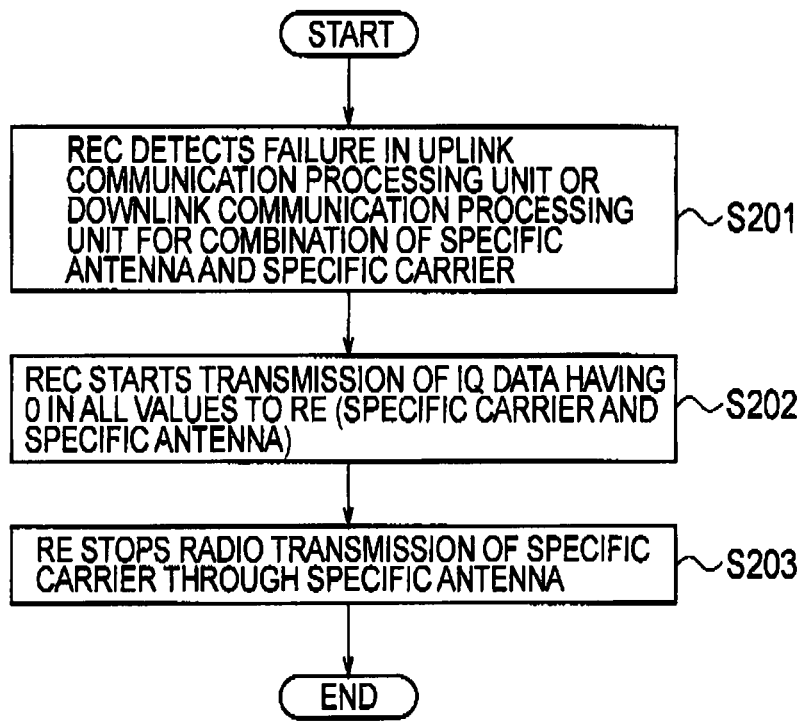
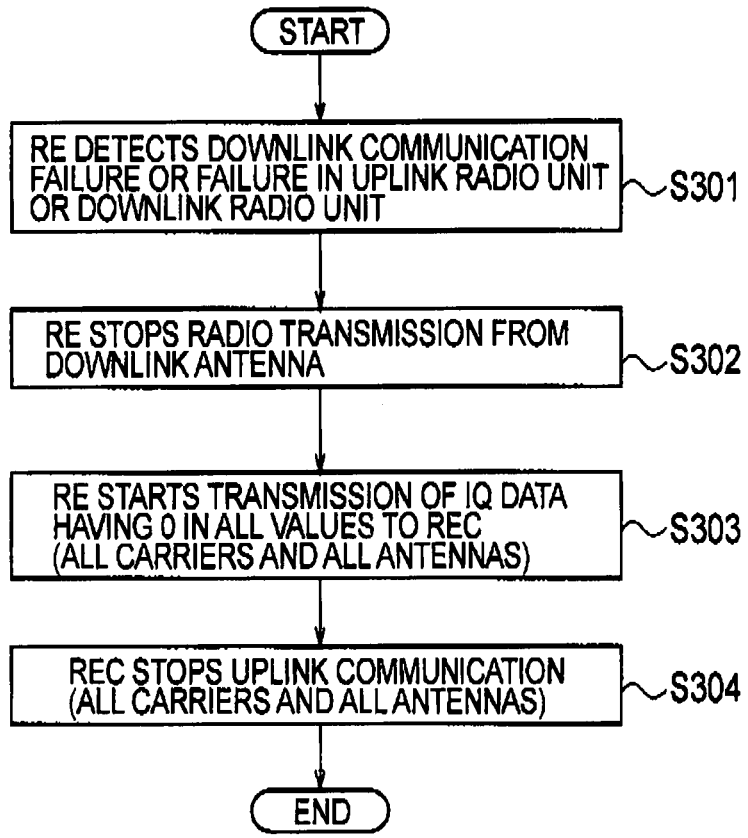

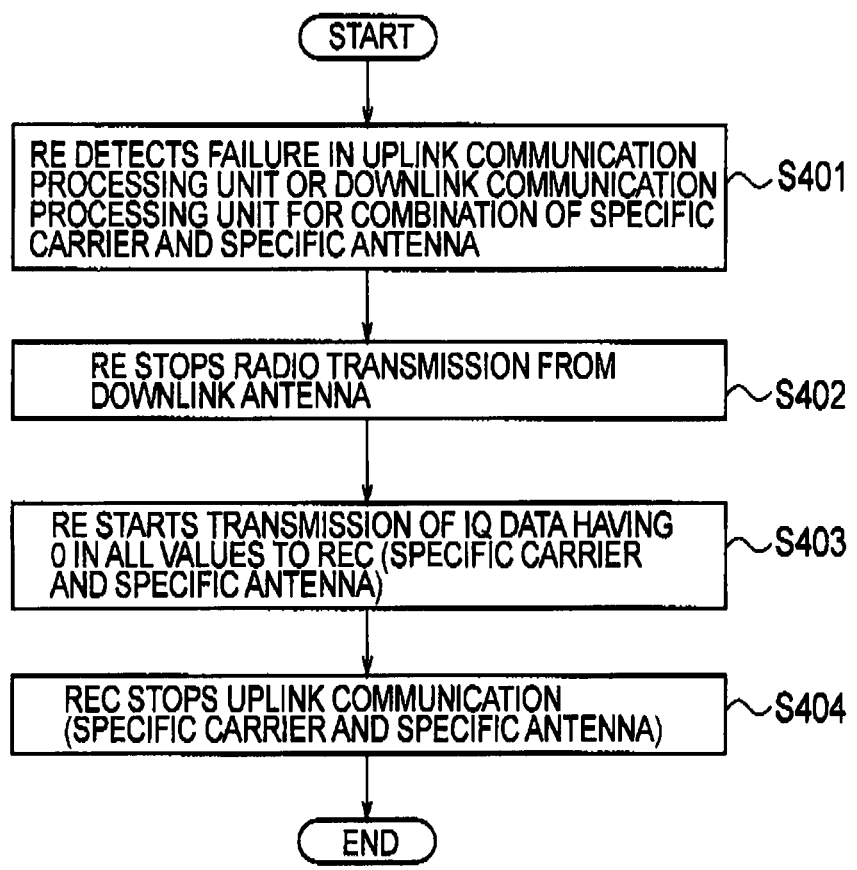

RADIO BASE STATION, RADIO EQUIPMENT CONTROL AND RADIO EQUIPMENT

TECHNICAL FIELD

The present invention relates to a radio base station, a radio equipment control, and radio equipment.

BACKGROUND ART

There has heretofore been known a radio base station BTS (Base Transceiver Station) which includes radio equipment RE and a radio equipment control REC, and is configured to allow the radio equipment RE and the radio equipment control REC to exchange signals through a physical circuit such as an optical line or an electric line.

SUMMARY OF THE INVENTION

Problem to be Solved by the Invention

However, the radio equipment RE and the radio equipment control REC included in the radio base station are separate devices connected to each other through the physical circuit. For this reason, even if a failure occurs in one of the devices, the other device cannot immediately detect the occurrence of such a failure. This leads to a problem that the radio communications cannot be stopped immediately.

To be more specific, as shown in FIG. 3, the radio equipment RE and the radio equipment control REC are configured to be able to always monitor each other's states in a "control and management plane" in Layer 3.

However, other monitor control signals are also always communicated in the "control and management plane." Hence, even if a failure occurs in one of the radio equipment RE and the radio equipment control REC, the other device cannot always detect a state monitoring signal immediately due to a congestion in the "control and management plane" or the like. This leads to a problem that the occurrence of such a failure cannot be detected immediately.

Therefore, the present invention was made in consideration of the above problems. It is an objective of the present invention to provide a radio base station, a radio equipment control, and radio equipment which are capable of immediately stopping radio communications in both of the radio equipment control REC and the radio equipment RE if a failure occurs in either one of those devices.

Means for Solving the Problem

A first feature of the present invention is summarized as a radio base station comprising radio equipment and a radio equipment control which are connected through a physical circuit, wherein the radio equipment includes: an uplink communication processing unit configured to transmit uplink IQ data, as uplink IQ data for a combination of each antenna and each carrier, to the radio equipment control through the physical circuit, the transmitted uplink IQ data acquired by demodulating an uplink signal of each carrier received through each antenna; and a downlink radio unit configured to transmit a downlink signal of each carrier through each antenna, the downlink signal acquired by modulating downlink IQ data for a combination of each antenna and each carrier received from the radio equipment control through the physical circuit, the radio equipment control includes: an uplink communication processing unit configured to acquire uplink user data from the uplink IQ data received from the radio equipment through the physical circuit; and a downlink communication processing unit configured to transmit the downlink IQ data acquired from downlink user data to the radio equipment through the physical circuit, in the radio equipment control, when the occurrence of an uplink communication failure is detected in the physical circuit, the downlink communication processing unit transmits the downlink IQ data for all combinations of antennas and carriers to the radio equipment with all values of the downlink IQ data set to "0", and the downlink radio unit stops the transmission of downlink signals of all the carriers through all the antennas when the downlink IQ data whose values are all "0" is received.

A second feature of the present invention is summarized as a radio base station comprising radio equipment and a radio equipment control which are connected to each other through a physical circuit, wherein the radio equipment includes: an uplink communication processing unit configured to transmit uplink IQ data, as uplink IQ data for a combination of each antenna and each carrier, to the radio equipment control through the physical circuit, the transmitted uplink IQ data acquired by demodulating an uplink signal of each carrier received through each antenna; and a downlink radio unit configured to transmit a downlink signal of each carrier through each antenna, the downlink signal acquired by modulating downlink IQ data for a combination of each antenna and each carrier received from the radio equipment control through the physical circuit, the radio equipment control includes: an uplink communication processing unit configured to acquire uplink user data from the uplink IQ data received from the radio equipment through the physical circuit; and a downlink communication processing unit configured to transmit the downlink IQ data acquired from downlink user data to the radio equipment through the physical circuit, in the radio equipment control, when the occurrence of a failure is detected in either the uplink communication processing unit which handles the uplink IQ data for a combination of a specific antenna and a specific carrier or the downlink communication processing unit which handles the downlink IQ data for a combination of a specific antenna and a specific carrier, the downlink communication processing unit transmits the downlink IQ data for the combination of the specific antenna and the specific carrier to the radio equipment with all values of the downlink IQ data set to "0," and the downlink radio unit stops the transmission of downlink signals of the specific carrier through the specific antenna when the downlink IQ data whose values are all "0" is received.

A third feature of the present invention is summarized as a radio base station comprising radio equipment and a radio equipment control which are connected to each other through a physical circuit, wherein the radio equipment includes an uplink radio unit configured to receive an uplink signal of each carrier through each antenna; an uplink communication processing unit configured to transmit uplink IQ data, as uplink IQ data for a combination of each antenna and each carrier, to the radio equipment control through the physical circuit, the transmitted uplink IQ data acquired by demodulating the received uplink signal; and a downlink radio unit configured to transmit a downlink signal of each carrier through each antenna, the downlink single acquired by modulating the downlink IQ data for a combination of each antenna and each carrier received from the radio equipment control through the physical circuit, the radio equipment control includes: an uplink communication processing unit configured to acquire uplink user data from the uplink IQ data received from the radio equipment through the physical circuit, and a downlink communication processing unit configured to transmit the downlink IQ data acquired from downlink user data to the radio equipment through the physical circuit, and in the radio equipment control, when the occurrence of a downlink communication failure in the physical circuit is detected, when the occurrence of a failure in the uplink radio unit is detected or when the occurrence of a failure in the downlink radio unit is detected, the downlink radio unit stops the transmission of downlink signals of all the carriers through all the antennas, and the uplink communication processing unit transmits the uplink IQ data for all combinations of antennas and carriers to the radio equipment control with all values of the uplink IQ data set to "0".

A fourth feature of the present invention is summarized as a radio base station comprising radio equipment and a radio equipment control which are connected to each other through a physical circuit, wherein the radio equipment includes: an uplink communication processing unit configured to transmit uplink IQ data, as uplink IQ data for a combination of each antenna and each carrier, to the radio equipment control through the physical circuit, the transmitted uplink IQ data acquired by demodulating an uplink signal of each carrier received through each antenna; a downlink communication processing unit configured to acquire a downlink signal of each carrier by modulating the downlink IQ data for a combination of each antenna and each carrier received from the radio equipment control through the physical circuit; and a downlink radio unit configured to transmit the acquired downlink signal of each carrier through each antenna, the radio equipment control includes: an uplink communication processing unit configured to acquire uplink user data from the uplink IQ data received from the radio equipment through the physical circuit; and a downlink communication processing unit configured to transmit the downlink IQ data acquired from downlink user data to the radio equipment through the physical circuit, and in the radio equipment, when the occurrence of a failure is detected in either the uplink communication processing unit which handles the uplink IQ data for a combination of a specific antenna and a specific carrier or the downlink communication processing unit which handles the downlink IQ data for a combination of a specific antenna and a specific carrier, the downlink radio unit stops the transmission of downlink signals of the specific carrier through the specific antenna, and the uplink communication processing unit transmits the uplink IQ data for the combination of the specific antenna and the specific carrier to the radio equipment control with all values of the uplink IQ data set to "0".

A fifth feature of the present invention is summarized as a radio equipment control connected to radio equipment through a physical circuit and included in a radio base station, comprising: an uplink communication processing unit configured to acquire uplink user data from uplink IQ data for a combination of each antenna and each carrier received from the radio equipment through the physical circuit; and a downlink communication processing unit configured to transmit downlink IQ data for a combination of each antenna and each carrier acquired from downlink user data to the radio equipment through the physical circuit, wherein when the radio equipment control detects the occurrence of an uplink communication failure in the physical circuit, the downlink communication processing unit transmits the downlink IQ data for all combinations of antennas and carriers to the radio equipment with all values of the downlink IQ data set "0", and the radio equipment stops the transmission of downlink signals of all the carriers through all the antennas when the downlink IQ data whose values are all "0" is received.

A sixth feature of the present invention is summarized as a radio equipment control connected to radio equipment through a physical circuit and included in a radio base station, comprising: an uplink communication processing unit configured to acquire uplink user data from uplink IQ data for a combination of each antenna and each carrier received from the radio equipment through the physical circuit, and a downlink communication processing unit configured to transmit downlink IQ data for a combination of each antenna and each carrier acquired from downlink user data to the radio equipment through the physical circuit, wherein when the radio equipment control detects the occurrence of a failure in either the uplink communication processing unit which handles the uplink IQ data for a combination of a specific antenna and a specific carrier or the downlink communication processing unit which handles the downlink IQ data for a combination of a specific antenna and a specific carrier, the downlink communication processing unit transmits the downlink IQ data for the combination of the specific antenna and the specific carrier to the radio equipment with all values of the downlink IQ data set "0", and the radio equipment stops the transmission of downlink signals of the specific carrier through the specific antenna when the downlink IQ data whose values are all "0" is received.

A seventh feature of the present invention is summarized as a radio equipment connected to a radio equipment control through a physical circuit and included in a radio base station, comprising: an uplink radio unit configured to receive an uplink signal of each carrier through each antenna, an uplink communication processing unit configured to transmit uplink IQ data, as uplink IQ data for a combination of each antenna and each carrier, to the radio equipment control through the physical circuit, the transmitted uplink IQ data acquired by demodulating the received uplink signal, and a downlink radio unit configured to transmit a downlink signal of each carrier through each antenna, the downlink signal acquired by modulating downlink IQ data for a combination of each antenna and each carrier received from the radio equipment control through the physical circuit, wherein when the radio equipment detects the occurrence of a downlink communication failure in any one of the physical circuit, the uplink radio unit, and the downlink radio unit, the downlink radio unit stops the transmission of downlink signals of all the carriers through all the antennas, and the uplink communication processing unit transmits the uplink IQ data for all combinations of antennas and carriers the radio equipment control with all values of the uplink IQ data set to "0".

An eighth feature of the present invention is summarized as a radio equipment connected to a radio equipment control through a physical circuit and included in a radio base station, comprising: an uplink communication processing unit configured to transmit uplink IQ data, as uplink IQ data for a combination of each antenna and each carrier, to the radio equipment control through the physical circuit, the transmitted uplink IQ data acquired by demodulating an uplink signal of each carrier received through each antenna, a downlink communication processing unit configured to acquire a downlink signal of each carrier by modulating downlink IQ data for a combination of each antenna and each carrier received from the radio equipment control through the physical circuit, and a downlink radio unit configured to transmit the acquired downlink signal of each carrier through each antenna, wherein when the radio equipment detects the occurrence of a failure in either the uplink communication processing unit which handles the uplink IQ data for a combination of a specific antenna and a specific carrier or the downlink communication processing unit which handles the downlink IQ data for a combination of a specific antenna and a specific carrier, the downlink radio unit stops the transmission of downlink signals of the specific carrier through the specific antenna, and the uplink communication processing unit transmits the uplink IQ data for the combination of the specific antenna and the specific carrier to the radio equipment control with all values of the uplink IQ data set to "0".

Effects of the Invention

As described above, the present invention can provide a radio base station, a radio equipment control, and radio equipment which are capable of immediately stopping radio communications in both of the radio equipment control REC and the radio equipment RE if a failure occurs in either one of those devices.

BRIEF DESCRIPTION OF THE DRAWINGS

FIG. 4 is a flowchart showing operations of the radio equipment and the radio equipment control in the radio base station according to the first embodiment of the present invention.

FIG. 5 is a flowchart showing operations of the radio equipment and the radio equipment control in the radio base station according to the first embodiment of the present invention.

FIG. 6 is a flowchart showing operations of the radio equipment and the radio equipment control in the radio base station according to the first embodiment of the present invention.

MODE FOR CARRYING OUT THE INVENTION (Configuration of Radio Base Station According to First Embodiment of the Present Invention)

Figure 1:
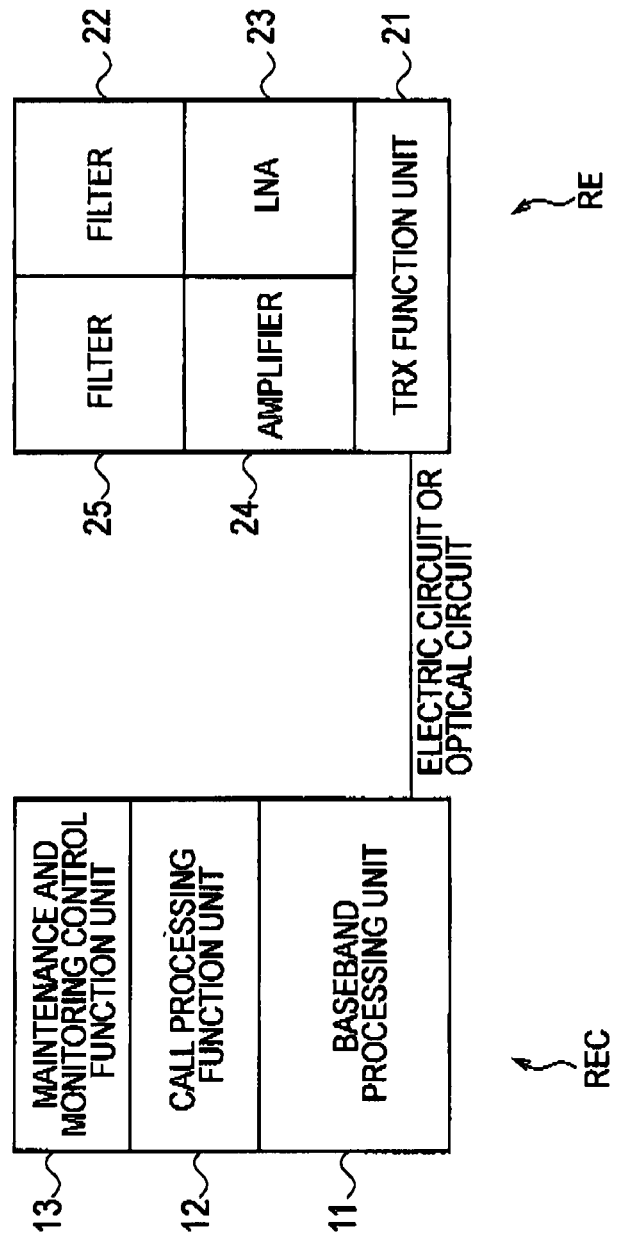
FIG. 1 is a functional block diagram of a radio base station according to a first embodiment of the present invention.
Figure 2:
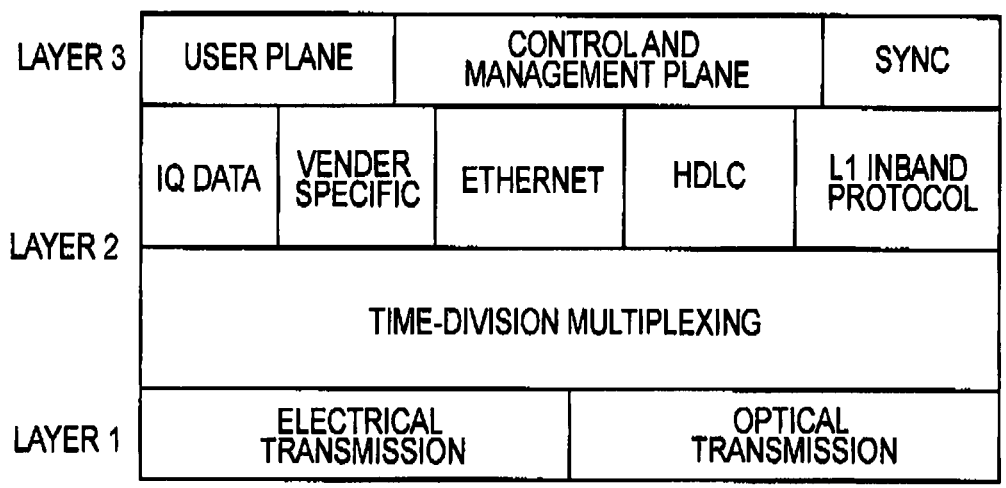
FIG. 2 is a diagram showing a protocol stack used by radio equipment and a radio equipment control included in the radio base station according to the first embodiment of the present invention.

With reference to FIGS. 1 and 2, description is given of a configuration of a radio base station BTS according to a first embodiment of the present invention.

As shown in FIG. 1, the radio base station BTS according to this embodiment includes radio equipment RE and a radio equipment control REC. Here, the radio equipment RE and the radio equipment control REC are separate devices and connected to each other through a physical circuit such as an optical line or an electric line. For example, the radio equipment RE and the radio equipment control REC are specified by a CPRI (Common Public Radio Interface).

The radio equipment RE includes, as functions of a reception system, a filter 22, an LNA (Low Noise Amplifier) 23 and a TRX function unit 21, and also includes, as functions of a transmission system, a TRX function unit 21, an amplifier 24 and a filter 25.

The filter 22 is configured to remove an interference signal from an uplink signal transmitted by a mobile station UE and received by each antenna.

The LNA 23 is configured to amplify the uplink signals (desired signal) inputted from the filter 22.

The amplifier 24 is configured to amplify a downlink signal inputted from the TRX function unit 21.

The filter 25 is configured to remove a noise signal from the downlink signal inputted from the amplifier 24.

The TRX function unit 21 implements a function of an uplink radio unit configured to receive an uplink signal of each carrier through each antenna (and the filter 22 and the LNA 23 for each antenna).

The TRX function unit 21 also implements a function of an uplink communication processing unit configured to transmit uplink IQ data to the radio equipment control REC through the physical circuit, as uplink IQ data for a combination of each antenna (antenna branch) and each carrier. Here, the transmitted uplink IQ data is acquired by demodulating the uplink signal of the each carrier received through the each antenna.

Here, the number of antennas (antenna branches) may be one or more. Therefore, in this specification, assuming that there is one antenna (antenna branch), the statement that "uplink IQ data and downlink IQ data for a combination of each antenna and each carrier" has the same meaning as "uplink IQ data and downlink IQ data for each carrier." Similarly, assuming that there is one antenna (antenna branch), the statement that "uplink IQ data and downlink IQ data for all combinations of antennas and carriers" has the same meaning as "uplink IQ data and downlink IQ data for all the carriers."

To be more specific, first, the TRX function unit 21 is configured to convert the uplink signal (radio frequency signal) of each carrier received through each antenna into an uplink signal (baseband signal).

Second, the TRX function unit 21 is configured to output an uplink signal of a certain output level by subjecting the uplink signal (baseband signal) to AGC (Automatic Gain Control) processing. Here, the AGC processing is a processing for changing the output level of the uplink signal according to the input level of the uplink signal.

Note that the TRX function unit 21 may be configured to determine whether or not to subject the uplink signal (baseband signal) to the AGC processing based on the dynamic range (30 dB or more in 3GPP) of the uplink signal and the number of available bits (line bit rate).

Third, the TRX function unit 21 is configured to demodulate (orthogonally demodulate) the uplink signal subjected to the AGC processing.

Fourth, the TRX function unit 21 is configured to output uplink IQ data for a combination of each antenna and each carrier by perform AD conversion processing (analog-digital conversion processing) on the demodulated uplink signal.

Fifth, the TRX function unit 21 is configured to transmit the uplink IQ data for the combination of each antenna and each carrier to the radio equipment control REC.

Moreover, the TRX function unit 21 implements a function of a downlink communication processing unit configured to acquire a downlink signal of the each carrier by modulating the downlink IQ data for the combination of each antenna and each carrier received from the radio equipment control REC through the physical circuit.

Furthermore, the TRX function unit 21 implements a function of a downlink radio unit configured to transmit the acquired downlink signal of each carrier through each antenna (and the amplifier 24 and the filter 25 for each antenna).

Here, with reference to FIG. 2, description is given of a configuration of a protocol stack, i.e., a transmission frame used by the radio equipment RE and the radio equipment control REC.

In the example shown in FIG. 2, the radio equipment control REC and the radio equipment RE are configured to transmit and receive "user plane information," "control and management plane information" and "SYNC information (synchronization information)" in inter-layer 3 communication therebetween.

To be more specific, layer 3 function units of the TRX function unit 21 and a baseband processing unit 11 (to be described later) are configured to map application information received from upper layer (layer 4) function units into any of a "user plane information region," a "control and management plane information region" and a "SYNC information region."

The radio equipment control REC and the radio equipment RE are also configured to transmit and receive "IQ data," "vender specific data," "Ethernet (registered trademark) data," "HDLC data," "L1 inband protocol data" and the like in inter-layer 2 communication therebetween.

Note that an L1 inband protocol is a protocol for performing maintenance of a link state in the layer 1, and the like.

To be more specific, layer 2 function units of the TRX function unit 21 and the baseband processing unit 11 are configured to map the "SYNC information (synchronization information)" received from the layer 3 function units into a "L1 inband protocol data region" in the transmission frame.

Moreover, the layer 2 function units of the TRX function unit 21 and the baseband processing unit 11 are configured to map the "control and management plane information" received from the layer 3 function units into any one of the "L1 inband protocol data region," a "HDLC data region," a "Ethernet (registered trademark) data region" and a "vender specific data region" in the transmission frame.

The layer 2 function units of the TRX function unit 21 and the baseband processing unit 11 are also configured to map the "user plane information" received from the layer 3 function units into the "vender specific data region" or an "IQ data region" in the transmission frame.

Furthermore, layer 1 function units of the TRX function unit 21 and the baseband processing unit 11 are configured to transmit the information received from the layer 2 function by time-division multiplexing on the electric line or the optical line.

As shown in FIG. 1, the radio equipment control REC includes the baseband processing unit 11, a call processing function unit 12 and a maintenance and monitoring control function unit 13.

The baseband processing unit 11 is configured to extract the IQ data, vender specific data, Ethernet (registered trademark) data, HDLC data, L1 inband protocol data and the like from the frame received from the radio equipment RE.

To be more specific, the baseband processing unit 11 implements a function of an uplink communication processing unit configured to acquire uplink IQ data for a combination of each antenna and each carrier from the IQ data mapped to the "IQ data region" in the transmission frame received from the radio equipment RE through the physical circuit, and to acquire uplink user data from the acquired uplink IQ data for the combination of each antenna and each carrier.

Here, the IQ data for the combination of each antenna and each carrier is mapped at a predetermined position within the "IQ data region." Note that a mapping position of the IQ data for the combination of each antenna and each carrier within the "IQ data region" is already known to the radio equipment control REC and the radio equipment RE.

For example, the baseband processing unit 11 includes a function to despread the received uplink IQ data for the combination of each antenna and each carrier.

The baseband processing unit 11 also implements a function of a downlink communication processing unit configured to generate downlink IQ data for each antenna and each carrier from the downlink user data acquired from the upper layer, and to transmit the generated downlink IQ data to the radio equipment RE through the physical circuit.

For example, the baseband processing unit 11 includes a function to spread the received downlink user data.

The call processing function unit 12 is configured to perform call processing control using the information (such as, e.g., the user plane information and the control and management plane information) outputted from the baseband processing unit 11.

The maintenance and monitoring control function unit 13 is configured to perform maintenance and monitoring control using the information (such as, e.g., the user plane information and the control and management plane information) outputted from the baseband processing unit 11.

(Operations of Radio Base Station According to First Embodiment of the Present Invention)

With reference to FIGS. 3 to 6, description is given of operations performed when various failures occur in the radio base station BTS according to the first embodiment of the present invention.

Figure 3:
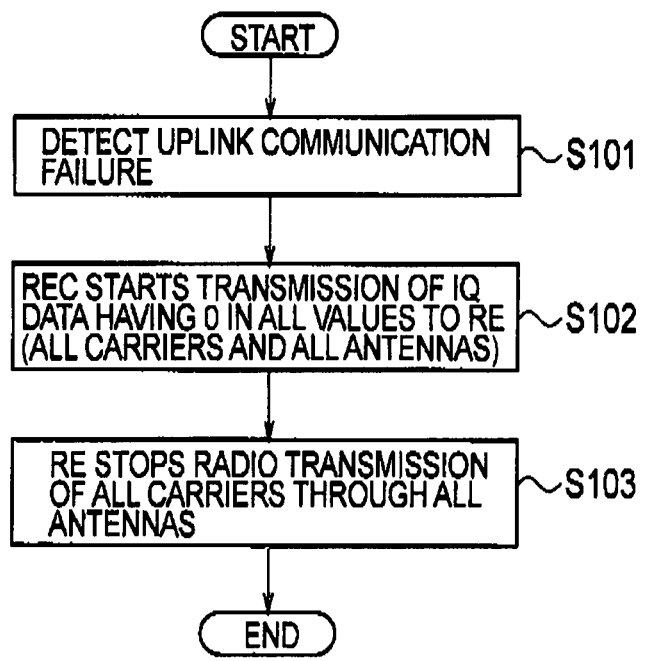
FIG. 3 is a flowchart showing operations of the radio equipment and the radio equipment control in the radio base station according to the first embodiment of the present invention.

First, with reference to FIG. 3, description is given of an operation performed when an uplink communication failure occurs in the physical circuit.

As shown in FIG. 3, in Step S101, the radio equipment control REC detects the occurrence of the uplink communication failure in the physical circuit.

For example, in Step S101, the baseband processing unit 11 detects, as the uplink communication failure, not a failure in the physical circuit itself (failure in "electrical transmission," "optical transmission" or "time-division multiplexing") but a communication failure in the "HDLC," "Ethernet (registered trademark)" or "control and management plane."

In Step S102, the downlink communication processing unit in the baseband processing unit 11 transmits the downlink IQ data for all combinations of antennas and carriers to the radio equipment RE with all values of the downlink IQ data set to "0".

Specifically, in Step S102, the downlink communication processing unit in the baseband processing unit 11 sets "0" in all the values of the downlink IQ data to be mapped to the "IQ data region" within the transmission frame.

In Step S103, when the downlink communication processing unit in the TRX function unit 21 has received said downlink IQ data, i.e., detected that all the values of the downlink IQ data for all the combinations of antennas and carriers are "0" in the "IQ data region" within the transmission frame, the downlink radio unit in the TRX function unit 21 stops the transmission of downlink signals of all the carriers through all the antennas.

Second, with reference to FIG. 4, description is given of an operation performed by the radio base station BTS when a failure occurs in some functions of the baseband processing unit 11 for a combination of a specific antenna and a specific carrier.

As shown in FIG. 4, in Step S201, the radio equipment control REC detects the occurrence of a failure in some functions of the baseband processing unit 11 for a combination of a specific antenna and a specific carrier.

For example, in Step S201, the baseband processing unit 11 detects the occurrence of a failure in some functions (such as, e.g., the function to perform despreading) of the uplink communication processing unit which handles the uplink IQ data for the combination of the specific antenna and the specific carrier.

Alternatively, the baseband processing unit 11 detects the occurrence of a failure in some functions (such as, e.g., the function to perform modulation) of the downlink communication processing unit which handles the downlink IQ data for the combination of the specific antenna and the specific carrier.

In Step S202, the downlink communication processing unit in the baseband processing unit 11 transmits the downlink IQ data for the combination of the specific antenna and the specific carrier to the radio equipment with all values of the downlink IQ data set to "0".

Specifically, in Step S202, the downlink communication processing unit in the baseband processing unit 11 sets "0" in all the values of the downlink IQ data for the combination of the specific antenna and the specific carrier among the downlink IQ data mapped to the "IQ data region" within the transmission frame.

In Step S203, when the downlink communication processing unit in the TRX function unit 21 has received said downlink IQ data, i.e., detected that all the values of the downlink IQ data for the combination of the specific antenna and the specific carrier are "0" in the "IQ data region" within the transmission frame, the downlink radio unit in the TRX function unit 21 stops the transmission of the downlink signal of the specific carrier through the specific antenna.

Third, with reference to FIG. 5, description is given of an operation performed by the radio base station BTS when a downlink communication failure occurs in the physical circuit, when a failure occurs in the uplink radio unit of the radio equipment RE, or when a failure occurs in the downlink radio unit of the radio equipment RE.

As shown in FIG. 5, in Step S301, the radio equipment RE detects the occurrence of a downlink communication failure in the physical circuit, the occurrence of a failure in the uplink radio unit in the TRX function unit 21 or the occurrence of a failure in the downlink radio unit in the TRX function unit 21.

For example, in Step S301, the downlink communication processing unit in the TRX function unit 21 detects, as the downlink communication failure, not a failure in the physical circuit itself (failure in "electrical transmission," "optical transmission" or "time-division multiplexing") but a communication failure in the "HDLC," "Ethernet (registered trademark)" or "control and management plane."

In Step S302, the downlink radio unit in the TRX function unit 21 stops the transmission of downlink signals of all the carriers through all the antennas.

In Step S303, the uplink communication processing unit in the TRX function unit 21 transmits the uplink IQ data for all the combinations of antennas and carriers to the radio equipment control REC with the all values of the uplink IQ data set to "0".

Specifically, in Step S303, the uplink communication processing unit in the TRX function unit 21 sets "0" in all the values of the uplink IQ data mapped to the "IQ data region" within the transmission frame.

In Step S304, when the uplink communication processing unit in the baseband processing unit 11 has received said uplink IQ data, i.e., detected that all the values of the uplink IQ data for all the combinations of antennas and carriers are "0" in the "IQ data region" within the transmission frame, the uplink communication processing unit stops the reception of uplink signals and the transmission of downlink signals for all the combinations of antennas and carriers.

Fourth, with reference to FIG. 6, description is given of an operation performed by the radio base station BTS when a failure occurs in some functions of the TRX function unit 21 for the combination of the specific antenna and the specific carrier.

As shown in FIG. 6, in Step S401, the radio equipment RE detects the occurrence of a failure in some functions of the TRX function unit 21 for the combination of the specific antenna and the specific carrier.

For example, in Step S401, the TRX function unit 21 detects the occurrence of a failure in some functions (such as, e.g., the function to perform demodulation) of the uplink communication processing unit which handles the uplink IQ data for the combination of the specific antenna and the specific carrier.

Alternatively, the TRX function unit 21 detects the occurrence of a failure in some functions (such as, e.g., the function to perform modulation) of the downlink communication processing unit which handles the downlink IQ data for the combination of the specific antenna and the specific carrier.

In Step S402, the downlink radio unit in the TRX function unit 21 stops the transmission of the downlink signal of the specific carrier through the specific antenna.

In Step S403, the uplink communication processing unit in the TRX function unit 21 transmits the uplink IQ data for the combination of the specific antenna and the specific carrier to the radio equipment control REC with all values of the uplink IQ data sets to "0".

Specifically, in Step S403, the uplink communication processing unit in the TRX function unit 21 sets "0" in all the values of the uplink IQ data for the combination of the specific antenna and the specific carrier among the uplink IQ data mapped to the "IQ data region" within the transmission frame.

In Step S404, when receiving said uplink IQ data i.e., detecting that all the values of the uplink IQ data for the combination of the specific antenna and the specific carrier are "0" in the "IQ data region" within the transmission frame, the uplink communication processing unit in the baseband processing unit 11 stops the reception of uplink signals for the combination of the specific antenna and the specific carrier.

(Advantageous Effects of Radio Base Station According to First Embodiment of the Present Invention)

In the radio base station according to the first embodiment of the present invention, the radio equipment RE and the radio equipment control REC can monitor each other's state using the "IQ data region." Thus, when a failure occurs in one of the radio equipment RE and the radio equipment control REC, the other device can immediately detect the occurrence of the failure regardless of the congestion in the "control and management plane" or the like.

In the radio base station according to the first embodiment of the present invention, the radio equipment control REC can, when detecting the occurrence of an uplink communication failure in the physical circuit, immediately stop the transmission of downlink signals in the radio equipment RE by transmitting the downlink IQ data for all the combinations of antennas and carriers to the radio equipment RE with all values of the downlink IQ data set to "0".

In the radio base station according to the first embodiment of the present invention, the radio equipment RE can, when detecting the occurrence of a downlink communication failure in the physical circuit or the occurrence of failures in the uplink radio unit and the downlink radio unit in the TRX function unit 21, immediately stop the transmission of downlink signals and the reception of uplink signals in the radio equipment control REC by transmitting the uplink IQ data for all the combinations of antennas and carriers to the radio equipment RE with all values of the uplink IQ data set to "0".

Moreover, in the radio base station according to the first embodiment of the present invention, the radio equipment control REC can, when detecting the occurrence of a failure in some functions of the baseband processing unit 11 for the combination of the specific antenna and the specific carrier, immediately stop only the transmission of downlink signals for the combination of the specific antenna and the specific carrier undergoing the failure in the radio equipment RE by transmitting the downlink IQ data for the combination of the specific antenna and the specific carrier to the radio equipment RE with all values of the downlink IQ data set to "0".

Furthermore, in the radio base station according to the first embodiment of the present invention, the radio equipment RE can, when detecting the occurrence of a failure in some functions of the TRX function unit 21 for the combination of the specific antenna and the specific carrier, immediately stop only the transmission of downlink signals and reception of uplink signals for the combination of the specific antenna and the specific carrier undergoing the failure in the radio equipment control REC by transmitting the uplink IQ data for the combination of the specific antenna and the specific carrier to the radio equipment control REC with all values of the uplink IQ data set to "0".

Note that operations of the above described radio equipment RE and radio equipment control REC may be implemented by hardware or may be implemented by a software module to be executed by a processor, or may be implemented in combination of the both.

The software module may be provided in any type of storage medium such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the radio equipment RE and radio equipment control REC. Also, the storage medium and the processor may be provided in the radio equipment RE and radio equipment control REC as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A radio base station comprising radio equipment and a radio equipment control which are connected through a physical circuit, wherein the radio equipment includes: an uplink communication processing unit configured to transmit uplink IQ data, as uplink IQ data for a combination of each antenna and each carrier, to the radio equipment control through the physical circuit, the transmitted uplink IQ data acquired by demodulating an uplink signal of each carrier received through each antenna; and a downlink radio unit configured to transmit a downlink signal of each carrier through each antenna, the downlink signal acquired by modulating downlink IQ data for a combination of each antenna and each carrier received from the radio equipment control through the physical circuit, the radio equipment control includes: an uplink communication processing unit configured to acquire uplink user data from the uplink IQ data received from the radio equipment through the physical circuit; and a downlink communication processing unit configured to transmit the downlink IQ data acquired from downlink user data to the radio equipment through the physical circuit, in the radio equipment control, when the occurrence of an uplink communication failure is detected in the physical circuit, the downlink communication processing unit transmits the downlink IQ data for all combinations of antennas and carriers to the radio equipment with all values of the downlink IQ data set to "0", and the downlink radio unit stops the transmission of downlink signals of all the carriers through all the antennas when the downlink IQ data whose values are all "0" is received.

2. A radio base station comprising radio equipment and a radio equipment control which are connected to each other through a physical circuit, wherein the radio equipment includes: an uplink communication processing unit configured to transmit uplink IQ data, as uplink IQ data for a combination of each antenna and each carrier, to the radio equipment control through the physical circuit, the transmitted uplink IQ data acquired by demodulating an uplink signal of each carrier received through each antenna; and a downlink radio unit configured to transmit a downlink signal of each carrier through each antenna, the downlink signal acquired by modulating downlink IQ data for a combination of each antenna and each carrier received from the radio equipment control through the physical circuit, the radio equipment control includes: an uplink communication processing unit configured to acquire uplink user data from the uplink IQ data received from the radio equipment through the physical circuit; and a downlink communication processing unit configured to transmit the downlink IQ data acquired from downlink user data to the radio equipment through the physical circuit, in the radio equipment control, when the occurrence of a failure is detected in either the uplink communication processing unit which handles the uplink IQ data for a combination of a specific antenna and a specific carrier or the downlink communication processing unit which handles the downlink IQ data for a combination of a specific antenna and a specific carrier, the downlink communication processing unit transmits the downlink IQ data for the combination of the specific antenna and the specific carrier to the radio equipment with all values of the downlink IQ data set to "0", and the downlink radio unit stops the transmission of downlink signals of the specific carrier through the specific antenna when the downlink IQ data whose values are all "0" is received.

3. A radio base station comprising radio equipment and a radio equipment control which are connected to each other through a physical circuit, wherein the radio equipment includes an uplink radio unit configured to receive an uplink signal of each carrier through each antenna; an uplink communication processing unit configured to transmit uplink IQ data, as uplink IQ data for a combination of each antenna and each carrier, to the radio equipment control through the physical circuit, the transmitted uplink IQ data acquired by demodulating the received uplink signal; and a downlink radio unit configured to transmit a downlink signal of each carrier through each antenna, the downlink single acquired by modulating the downlink IQ data for a combination of each antenna and each carrier received from the radio equipment control through the physical circuit, the radio equipment control includes: an uplink communication processing unit configured to acquire uplink user data from the uplink IQ data received from the radio equipment through the physical circuit, and a downlink communication processing unit configured to transmit the downlink IQ data acquired from downlink user data to the radio equipment through the physical circuit, and in the radio equipment control, when the occurrence of a downlink communication failure in the physical circuit is detected, when the occurrence of a failure in the uplink radio unit is detected or when the occurrence of a failure in the downlink radio unit is detected, the downlink radio unit stops the transmission of downlink signals of all the carriers through all the antennas, and the uplink communication processing unit transmits the uplink IQ data for all combinations of antennas and carriers to the radio equipment control with all values of the uplink IQ data set to "0".

4. A radio base station comprising radio equipment and a radio equipment control which are connected to each other through a physical circuit, wherein the radio equipment includes: an uplink communication processing unit configured to transmit uplink IQ data, as uplink IQ data for a combination of each antenna and each carrier, to the radio equipment control through the physical circuit, the transmitted uplink IQ data acquired by demodulating an uplink signal of each carrier received through each antenna; a downlink communication processing unit configured to acquire a downlink signal of each carrier by modulating the downlink IQ data for a combination of each antenna and each carrier received from the radio equipment control through the physical circuit; and a downlink radio unit configured to transmit the acquired downlink signal of each carrier through each antenna, the radio equipment control includes: an uplink communication processing unit configured to acquire uplink user data from the uplink IQ data received from the radio equipment through the physical circuit; and a downlink communication processing unit configured to transmit the downlink IQ data acquired from downlink user data to the radio equipment through the physical circuit, and in the radio equipment, when the occurrence of a failure is detected in either the uplink communication processing unit which handles the uplink IQ data for a combination of a specific antenna and a specific carrier or the downlink communication processing unit which handles the downlink IQ data for a combination of a specific antenna and a specific carrier, the downlink radio unit stops the transmission of downlink signals of the specific carrier through the specific antenna, and the uplink communication processing unit transmits the uplink IQ data for the combination of the specific antenna and the specific carrier to the radio equipment control with all values of the uplink IQ data set to "0".

5. A radio equipment control connected to radio equipment through a physical circuit and included in a radio base station, comprising: an uplink communication processing unit configured to acquire uplink user data from uplink IQ data for a combination of each antenna and each carrier received from the radio equipment through the physical circuit; and a downlink communication processing unit configured to transmit downlink IQ data for a combination of each antenna and each carrier acquired from downlink user data to the radio equipment through the physical circuit, wherein when the radio equipment control detects the occurrence of an uplink communication failure in the physical circuit, the downlink communication processing unit transmits the downlink IQ data for all combinations of antennas and carriers to the radio equipment with all values of the downlink IQ data set to "0", and the radio equipment stops the transmission of downlink signals of all the carriers through all the antennas when the downlink IQ data whose values are all "0" is received.

6. A radio equipment control connected to radio equipment through a physical circuit and included in a radio base station, comprising: an uplink communication processing unit configured to acquire uplink user data from uplink IQ data for a combination of each antenna and each carrier received from the radio equipment through the physical circuit, and a downlink communication processing unit configured to transmit downlink IQ data for a combination of each antenna and each carrier acquired from downlink user data to the radio equipment through the physical circuit, wherein when the radio equipment control detects the occurrence of a failure in either the uplink communication processing unit which handles the uplink IQ data for a combination of a specific antenna and a specific carrier or the downlink communication processing unit which handles the downlink IQ data for a combination of a specific antenna and a specific carrier, the downlink communication processing unit transmits the downlink IQ data for the combination of the specific antenna and the specific carrier to the radio equipment with all values of the downlink IQ data set to "0", and the radio equipment stops the transmission of downlink signals of the specific carrier through the specific antenna when the downlink IQ data whose values are all "0" is received.

7. A radio equipment connected to a radio equipment control through a physical circuit and included in a radio base station, comprising: an uplink radio unit configured to receive an uplink signal of each carrier through each antenna, an uplink communication processing unit configured to transmit uplink IQ data, as uplink IQ data for a combination of each antenna and each carrier, to the radio equipment control through the physical circuit, the transmitted uplink IQ data acquired by demodulating the received uplink signal, and a downlink radio unit configured to transmit a downlink signal of each carrier through each antenna, the downlink signal acquired by modulating downlink IQ data for a combination of each antenna and each carrier received from the radio equipment control through the physical circuit, wherein when the radio equipment detects the occurrence of a downlink communication failure in any one of the physical circuit, the uplink radio unit, and the downlink radio unit, the downlink radio unit stops the transmission of downlink signals of all the carriers through all the antennas, and the uplink communication processing unit transmits the uplink IQ data for all combinations of antennas and carriers the radio equipment control with all values of the uplink IQ data set to "0".

8. Radio equipment connected to a radio equipment control through a physical circuit and included in a radio base station, comprising: an uplink communication processing unit configured to transmit uplink IQ data, as uplink IQ data for a combination of each antenna and each carrier, to the radio equipment control through the physical circuit, the transmitted uplink IQ data acquired by demodulating an uplink signal of each carrier received through each antenna, a downlink communication processing unit configured to acquire a downlink signal of each carrier by modulating downlink IQ data for a combination of each antenna and each carrier received from the radio equipment control through the physical circuit, and a downlink radio unit configured to transmit the acquired downlink signal of each carrier through each antenna, wherein when the radio equipment detects the occurrence of a failure in either the uplink communication processing unit which handles the uplink IQ data for a combination of a specific antenna and a specific carrier or the downlink communication processing unit which handles the downlink IQ data for a combination of a specific antenna and a specific carrier, the downlink radio unit stops the transmission of downlink signals of the specific carrier through the specific antenna, and the uplink communication processing unit transmits the uplink IQ data for the combination of the specific antenna and the specific carrier to the radio equipment control with all values of the uplink IQ data set to "0".

* * * * *